Feb. 5, 1952
H. FISCHER
2,584,688
APPARATUS FOR DETERMINING MAP REFERENCES
IN NAVIGATION ACCORDING TO THE
HYPERBOLA METHOD
Filed April 17, 1948
2 SHEETS—SHEET 1
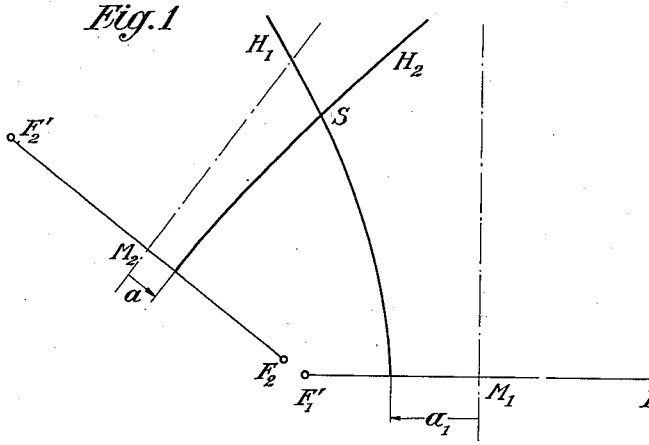
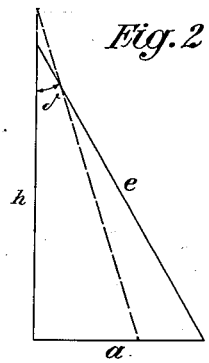
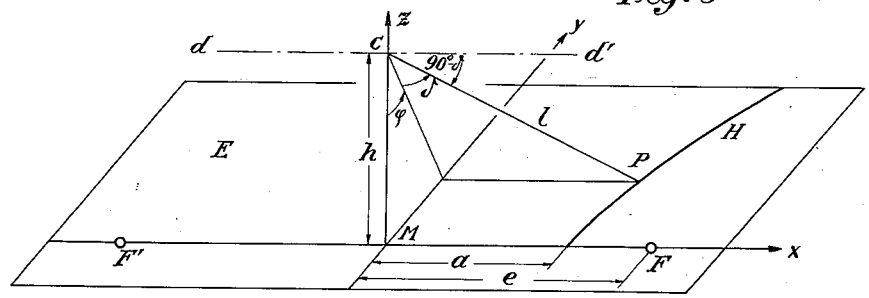
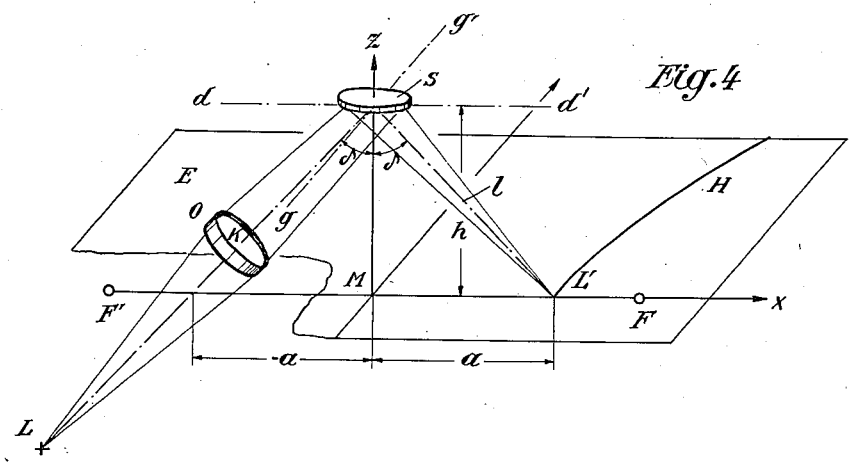
INVENTOR:
HARALD FISCHER
BY K. A. Mayr
ATTORNEY.

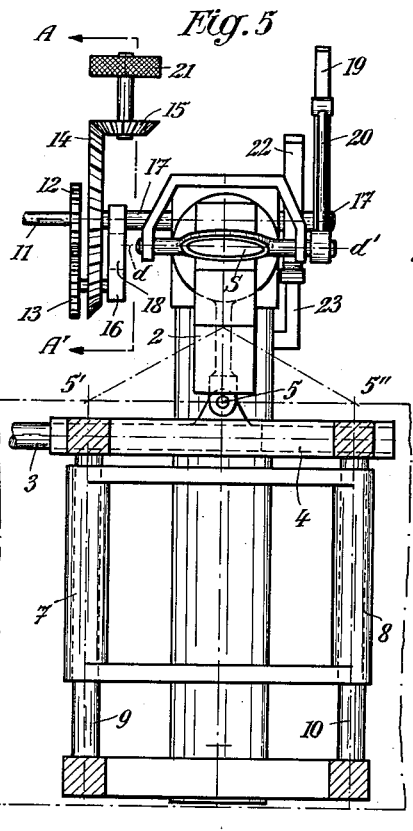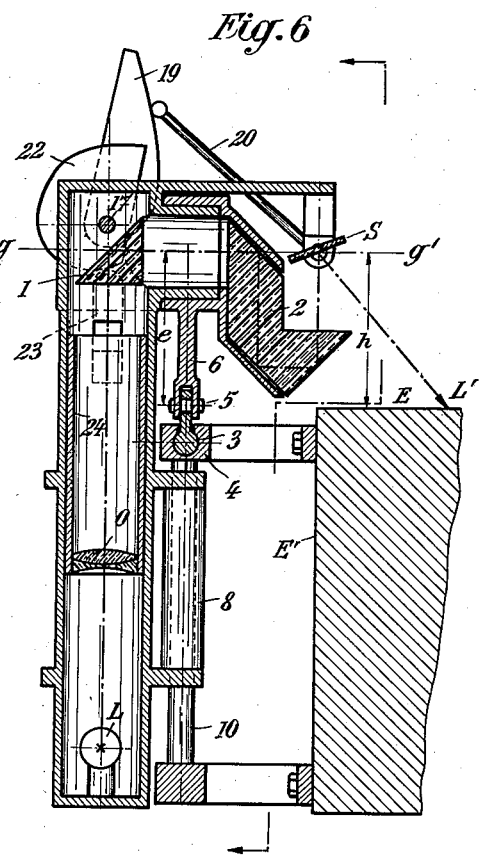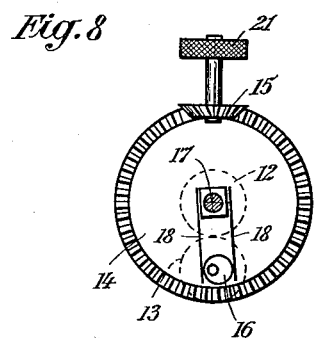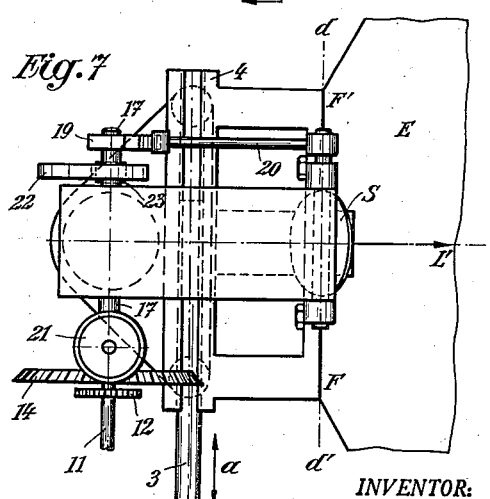

Patented Feb. 5, 1952

2,584,688

UNITED STATES PATENT OFFICE 2,584,688

APPARATUS FOR DETERMINING MAP REFERENCES IN NAVIGATION ACCORDING TO THE HYPERBOLA METHOD

Harald Fischer, Braunau a/Inn, Upper-Austria

Application April 17, 1948, Serial No. 21,664
In Austria October 11, 1947

8 Claims. (Cl. 33—1)

The invention is concerned with an apparatus for the determination of map references in navigation according to the hyperbola method.

For explaining the objects of the invention and the invention itself, reference is made to the accompanying drawings which illustrate what I at present consider to be a preferred embodiment of my invention.

In the drawings:

Fig. 1 is a diagram indicating the two-dimensional geometry of the conventional hyperbola method;

Fig. 2 is a diagram illustrating the kinematic basis of the system according to the invention;

Fig. 3 is a diagram illustrating the three-dimensional geometry of the system according to the invention;

Fig. 4 is a diagram as per Figure 3 including a light source, lens, and mirror system for carrying out the present invention;

Fig. 5 is a front elevation of an apparatus according to the invention;

Fig. 6 is a sectional side elevation of the apparatus shown in Fig. 5;

Fig. 7 is a plan view of the apparatus shown in Figs. 5 and 6;

Fig. 8 is a sectional elevational view of a detail of the apparatus according to Figures 5 to 7, the section being taken along line A—A' of Fig. 5.

As is known, this method works as follows: Two stationary radio or sound transmitters $F_1$ and $F_1'$ (Fig. 1) synchronously send dot signals, and at the receiving station (whose position is to be determined) the time lapse between the reception of the signals from the two transmitters is measured. Thereby the difference between the distances of the two transmitters from the receiving station is found at the same time. Any position to which a specific value of that difference corresponds is situated on a hyperbola $H_1$ whose foci coincide with the two transmitters, because the hyperbola has the geometric characteristic that the difference of the distances of any point of it from its foci is constant. The vertex distance $a_1$ of this hyperbola from the centre $M_1$ of the line $F_1$—$F_1'$ is algebraic, i. e. in respect of sign and magnitude it is equal to half the difference between the distances measured. If a second, suitably located pair of transmitters $F_2$ and $F_2'$ is operated in a similar manner, then a second distance difference is obtained and for the location of the receiving station a second hyperbola $H_2$. The point of intersection S of the two resultant hyperbolae $H_1$ and $H_2$ positively determines the position of the receiving station on the map.

In practice the determination of the position according to this method has so far been carried out by means of prepared special charts for one group each of two pairs of transmitters. On charts of this nature a group of closely consecutive hyperbolae, with the transmitters as foci, is entered for each of the two pairs of transmitters. Each one of these hyperbolae represents a specific value of the distance difference, and that value is affixed to the hyperbola. In either group that hyperbola requires to be interpolated which belongs to the distance difference measured at the receiving station, and the point of intersection of these two hyperbolae is the map reference to be ascertained.

This interpolation takes some time and may lead to errors and inaccuracies. Above all, the continuous indication of the navigational position on the chart—which would be particularly desirable in air navigation—is not possible with this method.

It is the object of the invention to make such continuous indication possible. According to the invention this is achieved in the following manner: Instead of using charts in which prepared groups of curves have been entered, the hyperbola for each pair of transmitters corresponding to the distance difference at the material moment is projected onto the chart plane in the correct position, shape and size (at least in the area of its intersection with the second hyperbola) by forming a point-like image of the source of light on the chart plane and imparting an oscillating motion to the axis of the pencil of rays on that cone surface which, when the distance difference at the material moment is taken into consideration, is intersected by the chart plane to yield the relevant hyperbola.

The position is indicated at all times by the point of intersection of the two hyperbolae.

In this connection the invention utilizes the fact that a hyperbola is produced as a conical section of a plane on the surface of a circular cone, if the cone axis is parallel to the cutting plane; this is shown in Fig. 3 in which in a system of rectangular co-ordinates with axes $x$, $y$, $z$, E is the plane determined by $x$ and $y$, F, F' are the foci, and M is the centre of the distance between them. The circular cone surface is generated by rotating the straight line CP, with C as the stationary vertex and a constant opening angle $90°-\delta$, about the cone axis $d-d'$. The conical section thus produced is the hyperbola H. To every angle $\delta$ belongs a specific hyperbola, and to every value of the angle of rotation $\varphi$ belongs a specific point of the hyperbola. Thus, in matheatical parlance, angle $\delta$ is the group parameter and angle $\varphi$ the curve parameter. By continuously varying angle $\delta$ conical sections forming a group of hyperbolae are obtained.

Confocal hyerbolae are formed when, concurrently with the variations of angle $\delta$, also the eight $h$ of the cone axis above plane E is varied in such manner that the condition $$h = e \cos \delta \quad \text{(Equation 1)}$$

is always fulfilled, wherein $e$ is half the focal istance given and is constant for the whole group of hyperbolae. In this case there is the relation $$a = e \sin \delta \quad \text{(Equation 2)}$$

between angle $\delta$ and the distance $a$ of the vertex of the hyeprbola generated.

Fig. 4 illustrates the basic principle of the invention. The pencil of rays oscillating on the cone surface is produced by a point source of light L and a lens system O which produce an image of the source of light L through reflection onto chart plane E by means of a plane mirror S. Like cone apex C in Fig. 3, the centre of the mirror S is at a distance $h$ from the chart plane. The optical axis LK of the image-forming system can be adjusted in relation to the straight line $g$—$g'$ (which goes through the centre of the mirror and is parallel to the $y$-axis of the system of co-ordinates shown in Figs. 3 and 4) at any desired angle $\delta$ to the $z$-axis. Mirror S can be swivelled about the cone axis $d$—$d'$ which is parallel to the $x$-axis.

If with a given and constant value of angle $\delta$ mirror S is swivelled about cone axis $d$—$d'$, then the axis of the reflected bundle of rays will describe the surface of that cone which is generated by the straight line CP in Fig. 3 in its rotation about cone axis $d$—$d'$. If in this process the distance of the lens system O from the source of light L in its dependence on the angle of swivel of mirror S is adjusted in such a manner that the image L' of the source of light remains at all times in the chart plane, then the hyperbola will appear as a sharply defined line in its entire length. This adjustment is necessary, because the distance of a point P of the hyperbola from cone apex C is governed by the angle $\varphi$ according to the relation $$l = \frac{e}{\cos \varphi} \quad \text{(Equation 3)}$$

in Fig. 3. Fig. 4 illustrates the position of the mirror and the path of the rays for the phase of rotation $\varphi = $ zero, at which the image of the vertex of the hyperbola is projected.

The installations required for the performance of the method of the invention—which, however, at the same time function quite independently of each other—are based on this principle and are uniform. Their design makes it possible to project out of the group of all confocal hyperbolae with a given focal distance onto the chart plane one specific hyperbola whose vertex distance $a$ corresponds to the distance difference at the material moment, and in so doing it fulfills the following four requirements:

*Requirement 1.—Angular adjustment.*—The optical axis LK of the image-forming system must form with the perpendicular to the chart plane the angle $\delta$ which, as a given kinematic value, is—in accordance with Equation 2—a function of the vertex distance $a$ introduced into the apparatus.

*Requirement 2. — Height adjustment. —* The projection system—represented by source of light L, lens system O and swivelling mirror S—must be adjustable as a whole in the direction perpendicular to the chart plane in such a manner that the centre of the mirror is located at a distance $h$—determined by Equation 1—above chart level.

*Requirement 3.—Angular adjustability of the mirror.*—The mirror must be given an oscillating swivelling motion about an adjustable central position about axis $d$—$d'$ in order to generate not a mere point but that required arc of the adjusted hyperbola which contains the point of intersection with the second hyperbola.

*Requirement 4.—Lens adjustment.*—The distance of lens system O from the source of light L requires adjustability dependent on the phase of rotation of mirror S in such manner that a clear picture of any part of the hyperbola is obtainable.

Requirements 1 and 2 are satisfied simultaneously, if the three values $a$, $h$ and $e$ form the sides of a rectangular triangle, as shown in Fig. 2. In the kinematic representation of H and of $\delta$ as a function of $a$ the invention utilizes this by making the hypotenuse of the triangle a rigid lever of length $e$ which can move only in such manner that its top end slides in a straight line perpendicular to the chart plane and its bottom end in a straight line parallel to the chart plane as indicated by dotted lines in Fig. 2.

In designing the details of the invention it must be taken into consideration that there are always two installations operating simultaneously. The compactness of the layout—which is necessary to avoid interference—is achieved by repeated refraction of the rays by means of prisms.

Figs. 5 to 7 show an example of an installation of the invention for the projection of the hyperbolae in front elevation, section and plan view respectively. Fig. 8 is a section on line A—A' in Fig. 5.

Details E, F, F', S, L, O, $d$—$d'$, $e$, $g$—$g'$, $a$ and $h$ are identical with those in Figs 3 and 4.

As in Fig. 4, the axis $d$—$d'$ around which the mirror swivels is at a distance $h$ from the level of the chart. The image of the source of light L is projected onto the chart plane by lens system O through the stationary prism 1 and a prism 2 which can be swivelled about axis $g$—$g'$, and by means of a mirror S.

Vertex distance $a$ of the hyperbola to be projected—corresponding in magnitude and sign to the distance difference appearing in the receiver—is continually introduced as the lateral movement of a sliding rod 3 which in Figs. 5 to 7 is shown in its central position $a = $ zero. According to the design of the receiver, the control of the sliding rod by the indication at the receiver can be realized in different ways. In general, the distance difference appears on the luminescent screen of an electronic ray oscillograph as the distance of a crest of a time curve from a zero-line. One possibility of transmitting this distance to the sliding rod lies in the observer covering up these crests with a movable strip before proceeding to the reading of the position. It is then possible to transmit the movement of the strip to the sliding rod by direct kinematic means. Fully automatic transmission can be achieved through a follow-up control with the aid of photoelectric cells; this method is well known to the expert and requires no detailed description.

Thus governed, the sliding rod slides in a guide 4 which is rigidly connected with carrier E' of chart plane E. The sliding motion of rod 3 is transmitted by means of a joint 5 to arm 6 of a bush which carries the mounting of prism 2 and can be swivelled about axis g—g'.

The provision of prisms 1, 2 constitutes an advantage over the arrangement in Fig. 4 insofar as it makes it unnecessary for the source of light and the lens system to take part in the angular adjustment demanded by requirement 1. This adjusting motion about axis g—g' is performed only by prism 2, its main facet forming the angle δ with the plane going through the axis and perpendicular to E. In Figs. 5 to 7 the prism is represented in the position where angle δ=zero.

The projecting system is movable as a whole in a direction perpendicular to the chart plane, having sleeves 7, 8 sliding on stay bolts 9, 10 rigidly connected with chart carrier E'. The length of arm 6, measured from its pivotal axis g—g' to the axis of the joint 5, equals e, i. e. half the focal distance. The rectangular triangle shown in Fig. 2 is for any given case represented by arm 6, by the distance h of the swivelling axis g—g' above chart level, and by the lateral movement a of sliding rod 3 away from its central position, so that for any given position of sliding rod 3 (see the double arrow a in Fig. 7) the tilt of the main facet of prism 2 at angle δ as demanded by requirement 1, and the height adjustment of the whole system, in dependence on the position of sliding rod 3 as demanded by requirement 2, are achieved automatically. The two extreme positions of joint 5 (e. g. for the values a=−0.9e, and a=0.9 e) are shown in Fig. 5 as 5' and 5" respectively.

The oscillating swivelling motion demanded by requirement 3 of mirror S about axis d—d' is provided for in the following manner: The revolution of a shaft 11 (driven, for example, by a small electric motor not shown here) is transmitted by means of gears 12, 13 to a an eccentric 16 located at a bevel gear 14 which sits loosely on a shaft 17. To a square piece rigidly fixed on shaft 17 are attached two leaf springs 18 whose loose ends grip round the eccentric and which impart to shaft 17 an oscillating swivelling motion of small amplitude. Alternatively, this oscillation may be produced by direct electric means, such as a vibrator. It is transmitted to mirror S and axis d—d' by means of cam disc 19 and cam follower lever or arm 20 pressed against the disc by means of a spring. The profile of cam disc 19 is such that the curved part of the adjusted hyperbola, produced by the oscillation of the swivelling mirror, is of the same length along the whole hyperbola. The frequency of the oscillation need not exceed a magnitude of 1 Hertz, if the chart plane is given a phosphorescent coating. The curved part produced may be moved along the adjusted hyperbola by manipulating a knob 21 whose revolution may be transmitted by a pinion 15 to bevel gear 14 and thus ultimately to shaft 17, since the axis of eccentric 16 follows the revolution of bevel gear 14.

The adjustment of lens system O according to requirement 4 is effected by means of another cam disc 22 located on shaft 17. Cam disc 22 is in contact with a spring-loaded cam follower arm 23 which adjusts lens system O (located inside tube 24) perpendicularly to the chart plane following the profile of the cam disc, and in so doing it controls the distance of the lens from the source of light in dependence on the rotation of shaft 17 and thus also in dependence on the swivelling of mirror S.

If, when the amplitude of the oscillation of the mirror is small, only a short curved section of the hyperbola is projected, then the curved sections produced by the two systems will form the arms of a luminous cross on the chart. In view of the fact that the point of intersection of the two arms moves about in consequence of the motion of the craft, it is necessary to keep the two projecting systems in intersection by re-adjustments repeated at fairly long intervals of time, by suitably turning the knob.

The images may be projected either from in front onto the white chart or from behind onto a sheet of ground glass on which the chart is drawn in black lines.

I claim:

1. An apparatus for indicating, by light marks the intersection of a plane with the surface of imaginary cones whose axes are parallel to the plane, said apparatus comprising a frame having a flat surface portion, a support slidably connected with said frame to slide in a direction at a right angle to the plane of said flat surface portion, a mirror connected with said support swingably about an axis parallel to the plane of said flat surface portion and coinciding with the axes of the imaginary cones, a source of light mounted on said support, and an optical system including a prism mounted on said support in such position as to receive a ray of light from said source and projecting it to said mirror at its swing axis, said prism being revolvable on said support about an axis at a right angle to the swing axis of said mirror and parallel to said flat surface portion for changing the angle enclosed by the light ray and the swing axis of said mirror.

2. An apparatus as defined in claim 1, said optical system comprising a lens system disposed on said support and interposed between said source of light and said prism for concentrating the light ray and having a movable lens for adjusting the concentration of the light ray.

3. An apparatus as defined in claim 1, comprising a shaft revolvably mounted on said support and having a longitudinal axis parallel to the swing axis of said mirror, a cam fixed to said shaft, a cam follower lever having one end fixed to said mirror and having a free end resting on said cam, and oscillating means connected with said shaft and imparting an oscillating motion thereto, said cam being so curved as to impart through said cam follower lever an oscillating movement to said mirror.

4. An apparatus as defined in claim 1, comprising a shaft revolvably mounted on said support and having a longitudinal axis parallel to the swing axis of said mirror, a cam fixed to said shaft, a cam follower lever having one end fixed to said mirror and having a free end resting on said cam, and means connected with said shaft for moving said shaft to swing said mirror about its swing axis through the agency of said cam and said cam follower lever.

5. An apparatus as set forth in claim 4, said means including oscillating means connected with said shaft and imparting an oscillating motion thereto, said cam being so curved as to impart through said cam follower lever an oscillating movement to said mirror.

6. An apparatus as set forth in claim 4, said optical system comprising a lens system disposed on said support and interposed between said source of light and said prism for concentrating the light ray and having a movable lens for adjusting the concentration of the light ray, a sec- ...l cam fixed on said shaft, and a cam follower ...tting said second cam and being connected ...h said movable lens for automatically adjust... said lens system in accordance with the po-...on of said shaft.

...'. An apparatus for indicating, by light marks, ... intersection of a plane with the surface of ...aginary cones whose axes are parallel to the ...ne, said apparatus comprising a frame hav-...: a flat surface portion, a support slidably con-...:ted with said frame to slide in a direction at a ...ht angle to the plane of said flat surface por-...n, a mirror connected with said support swing-...y about an axis parallel to the plane of said ...t surface portion which axis coincides with the ...:s of the imaginary cones, a source of light ...iunted on said support, an optical system in-...iding a prism mounted on said support in such ...iition as to receive a ray of light from said ...irce and projecting it to said mirror at its swing ...is, said prism being revolvable on said support ...out an axis at a right angle to the swing axis ... said mirror and parallel to said flat surface ...rtion, a slide member pivoted to said optical ...item, and a guide fixed on said frame and ex-...iding along a straight line parallel to the swing ... is of said mirror and receiving said slide mem-...r for changing the angle of projection of the ...ht ray from said optical system to the mirror ...on manipulation of said slide member and ...nultaneously changing the elevation of said ...pport with respect to said frame.

8. An apparatus as set forth in claim 7, com-...ising a shaft revolvably mounted on said support and having a longitudinal axis parallel to the swing axis of said mirror, a cam fixed on said shaft, an arm extending from said mirror and engaging said cam, oscillating means connected with said shaft for moving said shaft for oscillating said mirror about its swing axis by way of said cam and said arm, said cam being so curved as to impart through said arm an oscillating movement to said mirror, said optical system including a lens system disposed on said support between said light source and said prism and comprising a movable lens, a second cam fixed on said shaft, and a cam follower engaging said second cam and being connected with said movable lens for automatically adjusting said lens system in accordance with the position of said shaft for producing substantially the same strength of light at the point of impingement on said flat surface of the light ray reflected by said mirror at all operating conditions of said apparatus.

HARALD FISCHER.

REFERENCES CITED

The following references are of record in the file of this patent:

UNITED STATES PATENTS

| Number | Name | Date |
| --- | --- | --- |
| 2,072,286 | Wellington | Mar. 2, 1937 |
| 2,139,869 | Traub | Dec. 13, 1938 |
| 2,143,011 | Juhasz | Jan. 10, 1939 |
| 2,320,380 | Okolicsanyi et al. | June 1, 1943 |
| 2,433,860 | McDowell | Jan. 6, 1948 |
| 2,465,898 | Martin | Mar. 29, 1949 |